April 27, 1965        D. R. CASH        3,180,293

QUILTING MACHINE

Original Filed Oct. 17, 1960        7 Sheets-Sheet 1

*INVENTOR.*
DAVID R. CASH

BY

ATTORNEY

April 27, 1965

D. R. CASH 3,180,293

QUILTING MACHINE

Original Filed Oct. 17, 1960

INVENTOR.
DAVID R. CASH

BY

ATTORNEY

April 27, 1965  D. R. CASH  3,180,293
QUILTING MACHINE

Original Filed Oct. 17, 1960  7 Sheets-Sheet 3

INVENTOR.
DAVID R. CASH
BY Arthur J. Robert
ATTORNEY

INVENTOR.
DAVID R. CASH

April 27, 1965

D. R. CASH 3,180,293

QUILTING MACHINE

Original Filed Oct. 17, 1960

INVENTOR.
DAVID R. CASH

BY Arthur J Robert

ATTORNEY

April 27, 1965  D. R. CASH  3,180,293
QUILTING MACHINE

Original Filed Oct. 17, 1960  7 Sheets-Sheet 6

INVENTOR.
DAVID R. CASH
BY Arthur Robert
ATTORNEY

April 27, 1965   D. R. CASH   3,180,293
QUILTING MACHINE
Original Filed Oct. 17, 1960   7 Sheets-Sheet 7

INVENTOR.
DAVID R. CASH
BY
ATTORNEY

Patented Apr. 27, 1965

3,180,293
QUILTING MACHINE
David R. Cash, Louisville, Ky., assignor to James Cash
Machine Co., Louisville, Ky., a corporation of Kentucky
Continuation of application Ser. No. 63,044, Oct. 17, 1960.
This application Jan. 9, 1964, Ser. No. 337,984
17 Claims. (Cl. 112—118)

This application is a continuation of my now abandoned application S.N. 63,044 filed Oct. 17, 1960.

For many years it has been customary to quilt items such as mattress covers, upholstery units and quilts with an apparatus which comprises: (1) a rectangular, perimetrical workholding frame (having a rectangular opening across which an unsewn rectangular quilt-forming assembly or workpiece may be stretched) and means on the perimetrical frame for clamping the periphery of the stretched workpiece thereto; (2) a loading table for supporting a perimetrical frame while an unsewn workpiece is loaded thereon or a sewn workpiece is unloaded therefrom; and (3) a quilting machine for sewing the workpiece of a loaded perimetrical frame.

A conventional quilting machine comprises: (a) a fixed sewing machine having a needle-operating mechanism for sewing a succession of stitches and a locking mechanism for locking each stitch; (b) a stationary frame having a quilting space and including a base frame supporting the stitch locking mechanism in a fixed operative position on the underside of the quilting space and a head frame supporting the needle-operating mechanism in a fixed operative position on the top side of the quilting space; (c) carriage means mounted on the base frame to support the perimetric frame for back and forth movement both longitudinally and transversely while the workpiece on that frame is maintained in the quilting space; (d) a mechanical sewing-design guide on the base frame establishing the pattern of carriage movement which is to be followed in sewing the workpiece with a given design; and (e) drive means for operating the sewing machine while moving the carriage means in accordance with the sewing design guide.

In conventional operation: an empty perimetric frame is supported on the top of the loading table while an unsewn workpiece is stretched across its rectangular opening and its periphery clamped to the perimetric frame; the loaded perimetric frame is now moved along a horizontal transfer path into its operative position on the quilting machine; and the drive means is operated to energize the sewing machine and simultaneously move the carriage means in accordance with the sewing design guide. In this way, the workpiece is sewn along stitch lines, which reproduce the sewing design. At the end of the sewing operation, the thread is cut, the perimetric frame is returned along the same transfer path to the loading table where it is unloaded, reloaded and again moved along the transfer path into the quilting machine for another sewing operation.

In order to move a perimetric frame into or out of the quilting machine, its front end must be slotted to clear the presser foot of the sewing machine. Even then, the available clearance is so scant that the perimetric frame must be firmly pressed downwardly against the carriage and held as it is transferred in order to insure the passage of its front end underneath the presser foot. This necessarily reduces the speed at which the transfer of a perimetric frame can be effected.

To reduce the time lapse between the end of one sewing operation and the beginning of the next, it has been proposed to use two perimetric frames so that one may be placed on the machine for sewing purposes while the other is on the table for unloading and reloading purposes and to provide two transfer paths having vertically spaced center sections so that the perimetric frames on the machine and table may be contemporaneously interchanged with one frame passing over the other. While this arrangement does not reduce the care with which the front end of a frame must be passed underneath the presser foot, it enables a workpiece on a newly reloaded frame to be sewn while a sewn workpiece on the other frame is replaced by an unsewn workpiece. The present invention is directed in a general way to this type of apparatus.

A first major object is to provide the quilting machine with an improved head frame arrangement which makes possible the unrestrained rapid movement of a perimetrical frame into and out of its operative position on the machine.

Another important object is to provide the quilting machine with an improved arrangement which reduces the labor involved in moving a perimetrical frame along its horizontal transfer path in either direction between its operative and transfer positions on the quilting machine and which substantially increases the speed of such operations.

The first major objective of my invention is accomplished by mounting the head frame of the quilting machine on the base frame thereof for movement upwardly away from its operative (sewing) position to an out-of-the-way position in which the presser-foot does not interfere with or hamper the operations of inserting a perimetric frame into or removing it from the quilting space. In this way, the vertical dimension of the horizontal space in and through which a perimetric frame on the quilting machine can be moved is very substantially increased, making it possible to effect such movement rapidly and even carelessly. The quilting machine is further improved by providing it with a conveyor which transports incoming and outgoing perimetric frames between their operative and transfer positions on the machine and in this way reduces labor and increases the speed of production. Preferably it also operates to lock a frame automatically in its operative sewing position on the machine, as it conveys it into that position.

A second major object of the present invention is to provide an improved arrangement for interchanging perimetric frames between the quilting machine and the loading table and, more particularly, for reducing the labor and increasing the speed of the frame interchanging operations.

The second major objective of this invention may be achieved by doing the following: arranging the quilting machine to receive and discharge one perimetric frame at a frame-transfer position; by arranging the loading table to support the other frame at a workpiece-transfer position; and by providing a movable transport for transferring one perimetric frame from one transfer position to the other and reversely transferring the other perimetric frame. Preferably, the transfer positions are at different levels and an elevator is used to carry the frames back and forth or up and down between levels. During the sewing operation, this arrangement permits one frame to be on the quilting machine while the other perimetric frame is in its workpiece-transfer position where its workpiece can be unloaded onto or loaded from the loading table. During the interchange period, both frames are transferred to the elevator and the elevator thereafter moved to deliver the frame from the loading table level (preferably up) to the quilting machine level and vice versa. To simplify the elevator construction, one perimetric frame is made wider than the other.

The invention is illustrated in the accompanying drawings wherein.

The quilting apparatus illustrated, which, as a whole, has upper and lower transfer levels and a quilting space, comprises: (1) one wide upper and one narrow lower perimetric frame, each adapted to hold a workpiece; (2) a work loading table having a top for removably supporting the workpiece of (or for) either perimetric frame at the lower transfer level for unloading and reloading purposes; (3) a quilting machine adapted at one end to receive incoming and discharge outgoing perimetric frames at the upper transfer level and operative, between ends, to support either perimetric frame for back and forth movement both longitudinally and transversely with its workpiece occupying the quilting space of the machine for sewing purposes; and (4) a transport for contemporaneously interchanging said frames between two transfer positions, comprising (a) one transfer position wherein one frame is removed from the quilting machine and replaced by the other frame and (b) another transfer position wherein one workpiece is removed from said one frame and replaced by another workpiece.

PERIMETRIC FRAME

The upper and lower perimetric frames 1 and 1' have rectangular openings of the same size. These frames may be and preferably are identical in every respect except that the upper frame is slightly wider than the lower frame. This is done to facilitate the handling of these frames by a simple form of elevator.

Each perimetric frame comprises: a rigid rectangular sash-like rail frame having two sides and two ends; four clamping plates, one movably mounted on each side and end of the sash-like frame; a mechanism for locking each plate in its clamping position; and means for roller supporting the perimetric frame.

Rigid sash-like frame—FIGS. 1–4

Figures 4, 15:
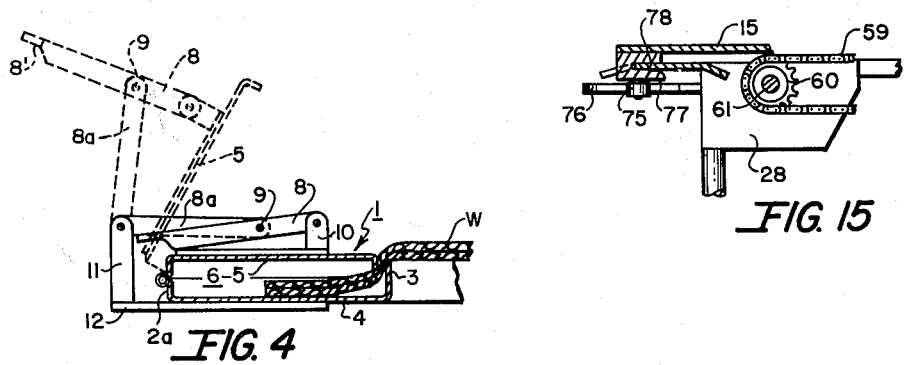
FIG. 4 is a section of a perimetric frame taken on line 4—4 of FIG. 3 to show, in full lines, the clamping position of the workpiece clamping means and, in dotted lines, the unclamping position thereof.
FIG. 15 is a vertical section taken along line 15—15 of FIG. 14.

Each rigid sash-like rail frame 2 is composed of two side rail members and two end rail members rigidly joined together to frame the rectangular opening across which a workpiece W may be stretched. Each rail member is in the form of an upwardly open metal channel, as seen in FIG. 4, having an outer leg 2a, an inner leg 3 and a bight which is designated 4 on the wide upper frame and 4' on the narrower lower frame. The outer legs 2a of these four channel-shaped rails cooperatively form the periphery of the bottom sash-like rail frame 2. The inner legs 3 cooperatively form the rectangular opening across which the workpiece W is stretched.

Clamping plates—FIG. 4

Each of the four clamping plates 5 is, as seen in FIG. 4, in the form of an inverted or downwardly open metal channel. Each clamping plate is mounted on its rail frame by hinging its outer leg to the outer leg 2a of the rail frame for movement between a horizontal closed position and a more or less vertical open position. The width of each top clamping plate 5 is slightly less than the width of its underlying rail frame 2 so that their inner legs cooperate to form an upwardly open slot in the closed position. The peripheral margin of a workpiece W on the perimetric frame extends downwardly through this slot with the excess material housed within the chamber 6 formed by each clamping plate 5 and its underlying rail. The inner leg of each clamping plate 5 and the inner leg 3 of its rail frame 2 cooperate to clamp the workpiece passing between them when the plate 5 is closed and its several locking mechanisms are operated to their respective locking positions.

Locking mechanism—FIG. 4

Each locking mechanism is in the form of a toggle-joint extending between its movable clamping plate 5 and the stationary sash-like rail frame 2. Each toggle joint comprises: a pair of toggle levers 8 and 8a, one of which (lever 8) is pivoted at its outer end to the clamping plate 5, the other of which (lever 8a) is pivoted at its opposite outer end to the rigid rail frame 2 and both of which are pivoted at their inner ends to each other through a common pivot 9; and means for manipulating the toggle levers 8 and 8a to move their common inner-end pivot 9 back and forth between a locking position on one side of dead center and an unlocking position on the other side of dead center.

The outer end of one lever 8 is pivoted to a post 10, which is rigidly mounted on the clamping plate 5. Likewise the outer end of the other lever 8a is pivotally connected to the upper end of an upright post 11, which is rigidly mounted to the adjacent frame rail 2 through a bracket 12 secured to the lower end of post 11.

As seen in FIG. 4, the means for manipulating the toggle-levers 8 and 8a may be conveniently and conventionally provided by extending the inner end of one of the levers, say lever 8, sufficiently beyond their common pivot 9 to enable such extension 8' to function as a lever for opening and closing the toggle-joint.

It will be understood that the toggle-joint is opened or closed with the clamping plate 5 in its closed position. Once the toggle-joint is opened, the clamping plate may be readily moved from its closed position to its open position. It will also be understood that the perimetric frame is conventionally provided with a number of the above locking mechanisms along each of the sides and ends of the perimetric frame.

*Roller supporting means—FIGS. 1–3 and 5*

Figure 3:
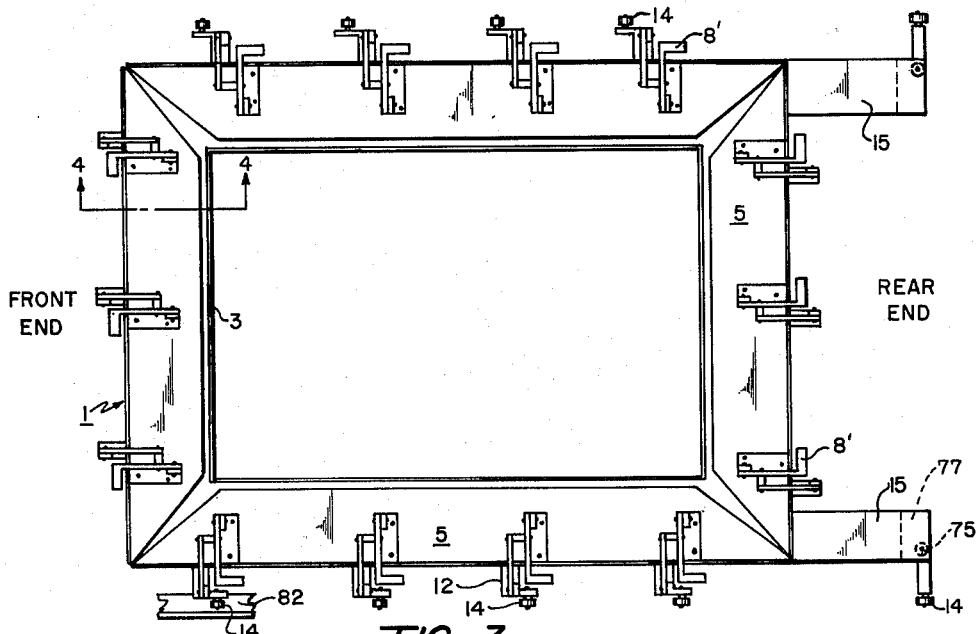
FIG. 3 is a top plan view of a (wide) perimetric workholding frame.

The means for roller-supporting each perimetric frame includes a series of rollers 14 along each side of each frame. Each roller is carried by the adjacent rail frame member through the agency of a suitable bracket. Where possible, they are mounted on the brackets 12 which are associated with the locking mechanism but, at the rear end of the frame, special brackets 15 are used, these brackets projecting rearwardly from the frame and terminating in outwardly turned lateral extensions, each of which carries a supporting roller 14, as can be seen in FIG. 3.

WORK LOADING TABLE
(FIGS. 1, 5–6 and 11-12)

The work loading table supports perimetric frame 1 or 1' at the lower transfer level for workpiece loading and unloading purposes while a workpiece W on the other frame is being sewn by the quilting machine.

This work loading table comprises: a stationary table frame 17 having a table top 17a; and a suitable supporting structure including four vertical legs 18, one at each corner of the table, together with suitable leg-interconnecting braces.

QUILTING MACHINE

The quilting machine, which is arranged in spaced end-to-end relationship with the work table, incorporates conventional and improved structure.

CONVENTIONAL STRUCTURE
(FIGS. 6-9)

Figure 6:
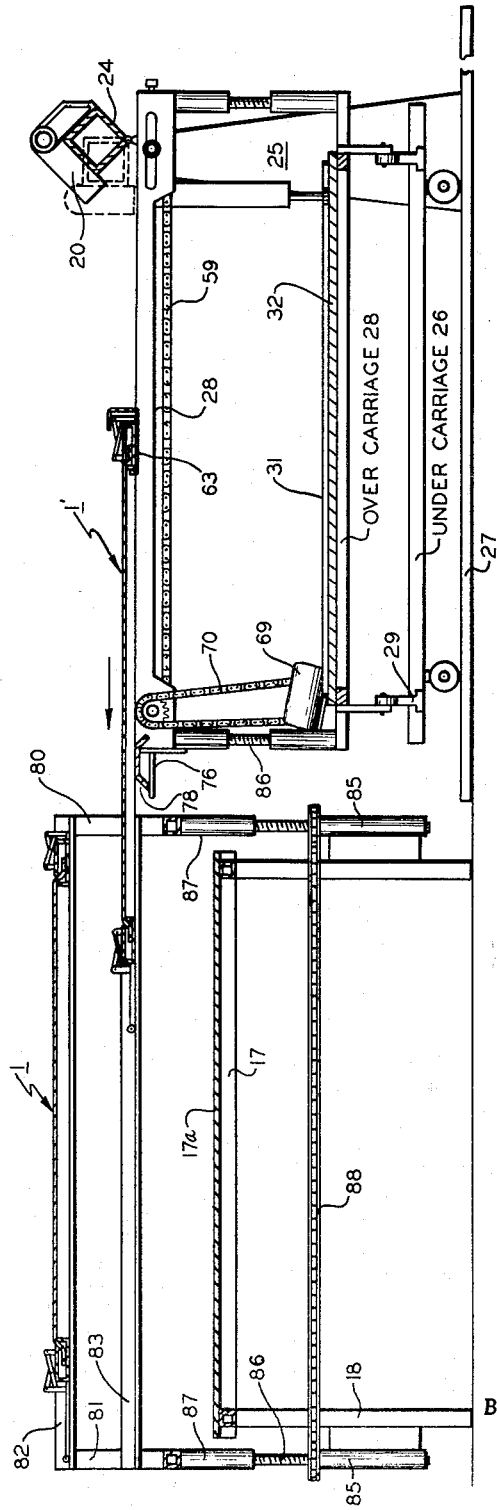
FIG. 6 is a vertical longitudinal section taken along the approximate center of the apparatus, this section showing a reloaded wide perimetric frame on the elevator and a narrow perimetric frame being discharged from the quilting machine.
Figure 7:
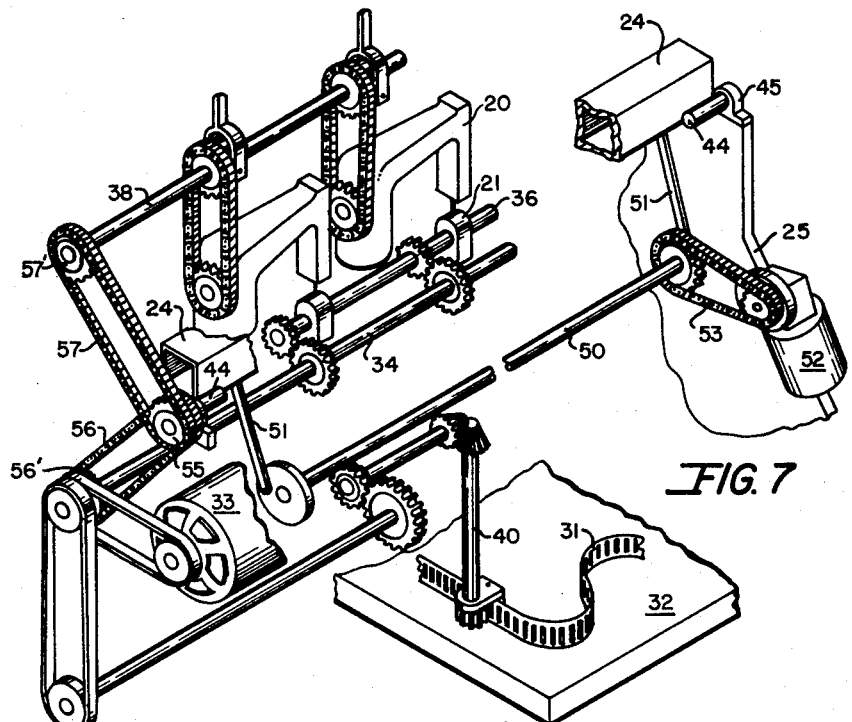
FIG. 7 is a perspective view of the drive arrangement for the sewing machine and carriage and for moving the head frame.

This machine conventionally includes: (a) a pair of sewing machines 20, which are best seen in FIG. 7, each having a needle operating mechanism or sewing head 20 for sewing a succession of stitches and a locking mechanism 21 for locking each stitch; (b) a stationary frame having a quilting space and including (1) a lower cross base frame 23 supporting the stitch locking mechanism 21 in a fixed operative position on the underside of the quilting space, (2) an upper cross head frame 24 supporting the needle operating mechanism or sewing head 20 in a relatively fixed operating position on the top-side of the quilting space and (3) opposite side standards 25 supporting opposite ends of the lower cross base frame 23 and cross head frame 24; (c) carriage means (supported by the floor which carries the stationary frame members 23–25) to support a perimetric frame for back and forth movement both longitudinally and transversely while the workpiece W on that frame is maintained in the quilting space, this carriage means including, as can best be seen in FIGS. 1 and 6, a longitudinally movable under-carriage 26 supported on longitudinally extending floor-based trackways 27 and a transversely movable over-carriage 28, which is wholly supported on transversely extending trackways 29 fixedly carried by the under-carriage 26; (d) a mechanical sewing-design guide 31 supported on a plate 32 which, as seen in FIG. 6, is fixed to the over-carriage 28, this guide 31 being shaped to establish the pattern of carriage movement which is to be followed in order to sew the workpiece with a desired design; and (e) drive means for operating the sewing machine and moving the carriage means, said drive means including, as can be best seen in FIG. 7, (1) a common drive which begins with a side-standard-mounted main drive motor 33 (see FIG. 2) and ends with a main base-frame-mounted horizontal shaft 34, (2) a stitch-locking-mechanism or bobbin drive which begins with the end shaft 34 of the common drive and which ends with a base-frame-mounted horizontal shaft 36 driving locking mechanism 21, (3) a needle-operating mechanism or sewing head drive which begins with the common horizontal drive shaft 34 and ends with head-frame-mounted horizontal shaft 38 driving both head-frame-mounted needle operating mechanisms or sewing heads 20, and (4) a carriage drive which begins with the common horizontal shaft 34 and ends with a base-frame-mounted vertical shaft 40 driving both the undercarriage 26 and the over-carriage 28 through sewing design guide 31 which is mounted on the overcarriage 28 through plate 32.

IMPROVED QUILTING MACHINE STRUCTURE

Now, in accordance with the first major objective of my invention and to reduce labor and increase production speed, the quilting machine is improved (1) by mounting the upper cross head frame 24 on the standards 25 of the base frame for pivotal movement between operative and out-of-the-way positions, (2) by modifying the needle-operating mechanism drive to accommodate the pivoted movement of the head and (3) by providing this machine with means for transporting perimetric frames between operative and transfer positions on the machine and for holding (i.e. centering and restraining or locking) them in the operative position on the machine.

Figures 8, 9:
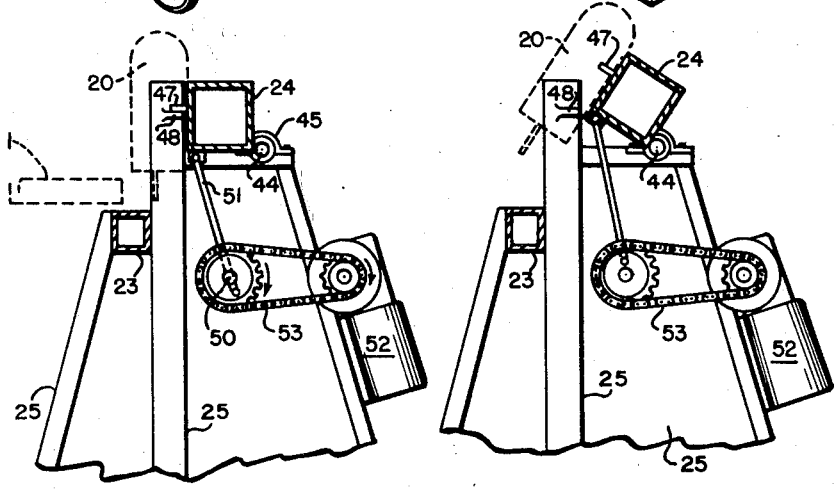
FIG. 8 is a fragmentary vertical longitudinal section taken on line 8—8 of FIG. 2, this section showing the head frame in its normal operative position, the sewing head being indicated in dotted lines.
FIG. 9 is a fragmentary section similar to FIG. 8 with the head frame swung to its out-of-the-way position.

*Pivotally mounted head frame means—FIGS. 7–9*

This means includes: means pivotally mounting the head frame 24 on the side standards 25 for swinging movement; and drive means for swinging the head frame.

As seen in FIGS. 7 to 9, the head frame 24 is in the form of an elongate box beam extending transversely across the quilting machine and having, at each end, a short transversely extending outwardly projecting horizontal pintle 44. The pintles 44 are axially aligned with each other and their outwardly projecting ends are pivoted in suitable bearing blocks 45 (FIG. 7) fixed on the tops of the base frame standards 25. In this way, the head frame 24 swings upwardly away from and downwardly toward the machine about the common horizontal axis of the pintles. In its lower operative sewing position, the upper cross head frame 24 rests solidly on the base frame standards 25 through the agency of a pair of stops 47, one welded to each end of the head frame in position to rest on a side standard ledge 48, as seen in FIG. 8.

The drive means for swinging or tilting the head frame 24, as seen in FIG. 7, includes: a horizontal crankshaft 50 which extends between and is rotatably mounted on the base frame standards 25 and is spaced below the head frame 24; a crank 51 at each end of the crankshaft 50 having an eccentric connection with both the crankshaft 50 and the upper cross head frame 24 so that turning the crankshaft 50 alternately swings the head frame 24 up to its out-of-the-way position and then lowers it to its operative sewing position resting on the base frame ledges 48, the vertical movement of the head frame being reversed at the end of each ½ turn of the crankshaft 50; an electric motor 52 mounted (FIGS. 8–9) on the base frame standard 25, on the opposite side of the quilting machine from the motor 33; and a chain and sprocket driving connection 53 between the crankshaft 50 and the motor 52. The electric motor 52 is operated by switches (not shown) mounted at a convenient location on the quilting machine, where they are readily available to an operator. In moving between its operative and out-of-the-way positions, the head frame 24 swings through an angle of about 45°.

*Modified needle-operating mechanism drive*

The conventional sewing head drive for reciprocating the needle is modified to allow the head frame 24 to be moved pivotally without disturbing the operativeness of the drive connection extending between the stationary base frame 23, 25 and the movable head frame 24. As seen in FIG. 7, this result is accomplished by mounting a double idler sprocket 55 on the base frame, at the side standard carrying the main drive motor 33, with its axis aligned with the common axis of the head-frame-tilting pintles 44, and interconnecting that sprocket 55 with the drive on the base frame through drive chain 56 and sprocket 56′, and with the drive on the head frame 24 through chain 57 and sprocket 57′. With this type of interconnection between the two shafts 34 and 38, the swinging movement of the head frame 24 on the base frame simply causes the drive chain 57 on the head frame to ride around its member of the double sprocket 55 to an extent corresponding to the angle over which the head frame 24 moves and to undergo such movement without changing the tension of the drive chains 57 and 56, or otherwise adversely affecting the drive interconnection.

*Frame conveying and holding means—FIGS. 1–2, 6 and FIGS. 11–13*

The conveying and holding means include: a conveyor mounted on the top of the over-carriage 28; a latch bar mounted on the conveyor for grasping the front end of a work-holding perimetric frame and thereby hitching it to the conveyor; means for driving the conveyor to move the perimetric frame back and forth between its operative and transfer positions on the machine; and holding means for centering and restraining or locking the perimetric frame in its operative position on the machine.

The conveyor is carried by the over-carriage 28. This conveyor includes a pair of transversely-spaced longitudinally-extending endless conveyor chains 59 mounted to extend horizontally along the opposite longitudinal sides of the over-carriage 28 and to ride on sprockets 60 located at opposite ends of the over-carriage 28. Each sprocket 60 on one side is transversely aligned with and connected to a corresponding sprocket 60 on the other side of the over-carriage 28 by a common shaft 61 which extends transversely across the over-carriage and is rotatably mounted on it. This arrangmeent gangs the sprockets, on the opposite sides of the over-carriage together and forces both chains 59 to move in unison.

Figure 11:
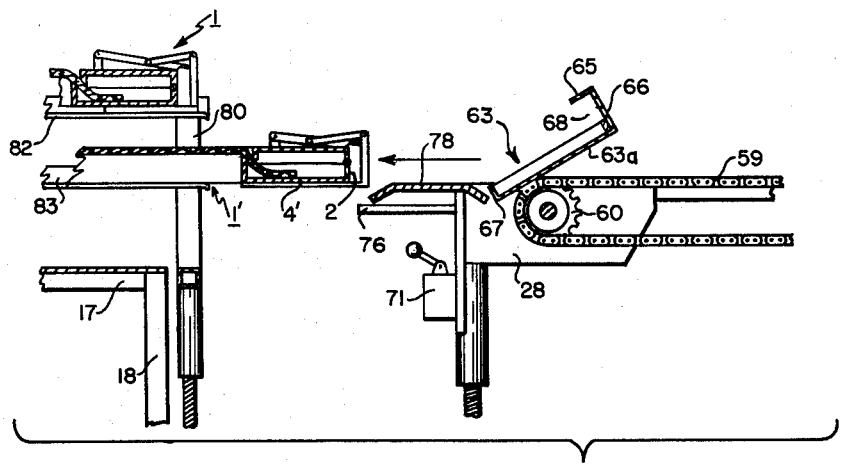
FIG. 11 is a fragmentary longitudinal vertical section through adjacent end portions of the quilting machine on the right and the table and elevator on the left, this section showing the relationship of the quilting machine, table and conveyor immediately after the narrow perimetric frame disengages the quilting machine.
Figure 12:
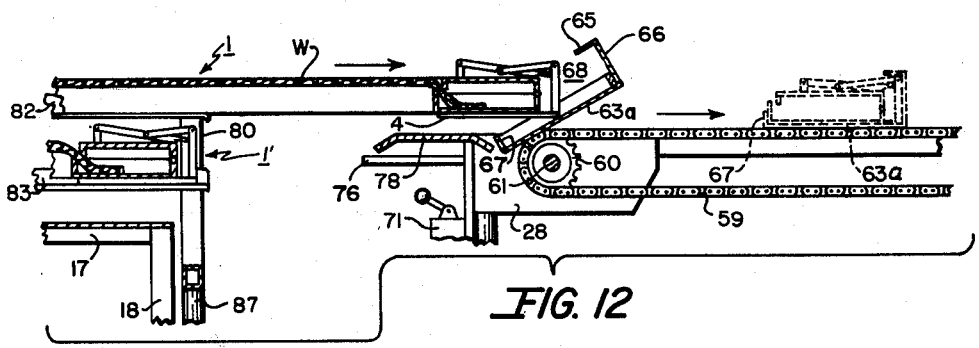
FIG. 12 is a view similar to FIG. 11 but showing the front end portion of the wide perimetric frame, in full lines, as it appears when it initially engages the quilting machine conveyor, and, in dotted lines, as it appears when it has been operatively engaged by the conveyor and pulled a short distance toward its operative position on the quilting machine.

The latch or latch bar 63, for hitching or latching a perimetric frame to the conveyor, extends transversely across the pair of conveyor chains 59, at right angles thereto, and, as seen in FIGS. 11–12, is fixed to both conveyor chains so that it is bodily carried forwardly and rearwardly along the top of the over-carriage 28 by the conveyor. The latch bar 63 just about reaches the frame transfer position at one end of the machine, where further rearward movement carries its slightly downwardly around the rear sprockets 60 before it is stopped in the transfer position against the over-carriage structure. This slight travel of the latch bar 63 around the rear sprockets 60 leaves it tilted in a rearwardly declining attitude ready for its reception of the front end of a perimetric frame.

Looking at the latch bar 63 in section, it may be considered as a rearwardly open J-shaped section formed by a long lower horizontal leg 63a, a short upper horizontal leg 65 and a vertical bight 66 joining the front edges of the legs 63 and 65 together. In addition, several short upwardly projecting hook tabs 67 are fixed on the rear edge of the lower long leg 63.

Looking at FIG. 12, where the latch bar 63 is in its tilted position at the rear end of the quilting machine, a perimetric frame at the upper perimetric-frame transfer level of that machine can be moved forwardly to cause its front end rail 2 to ride over or pass above the hook tabs 67 and enter the latch bar pocket 68 formed between the legs 63 and 65. This pocket 68 also receives the clamping plate locking mechanism. Normally, the perimetric frame is moved forwardly during the transfer with sufficient force to enter the pocket 68 and strike the bight 66 of the latch bar 63 with enough momentum to move the conveyor forwardly far enough to tilt bar 63 down to its horizontal position. The "untilting" movement, which returns the latch bar 63 to its horizontal position, swings the tabs 67 upwardly into the rectangular opening of the perimetric frame where they extend behind or on the rear side of the foremost channel-shaped cross member of the sash frame 2 to lock the perimetric frame securely to the latch bar 63, as shown in dotted lines in FIG. 12.

Figure 1:
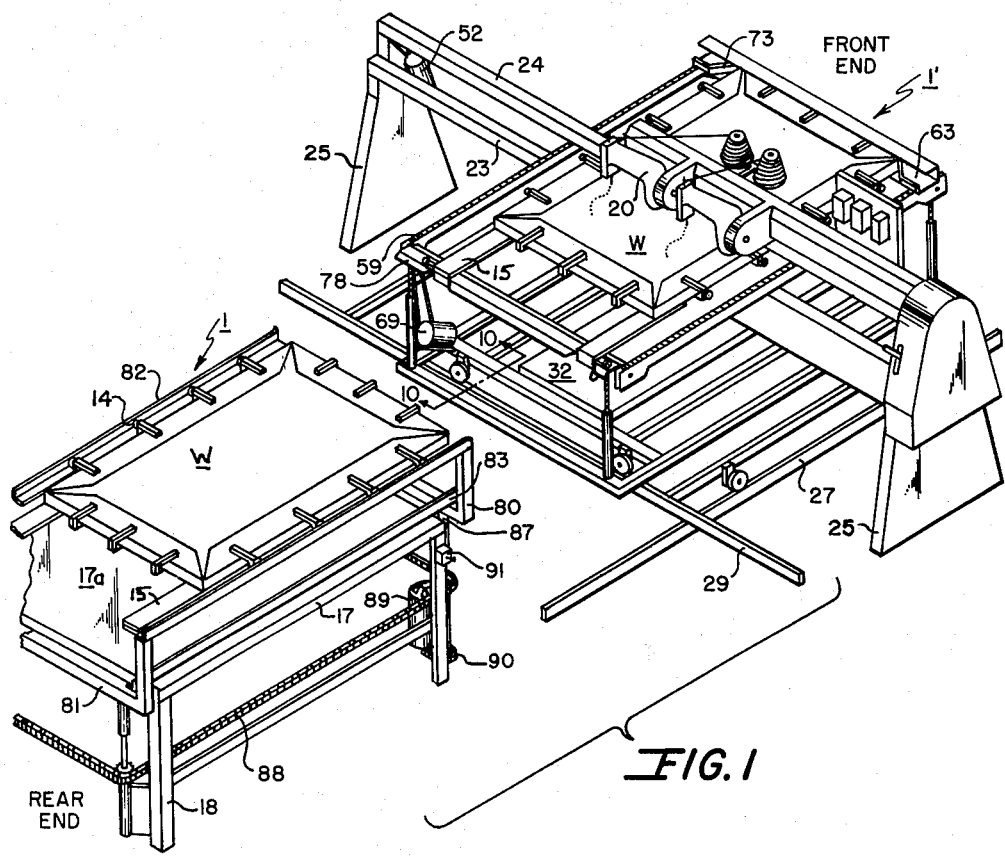
FIG. 1 is a perspective and somewhat schematic view of a quilting apparatus constructed in accordance with the present invention, this view showing a loaded (narrow) perimetric frame on the quilting machine and a reloaded (wide) perimetric frame on the elevator, which is holding it at an elevation above the loading table.
Figure 10:
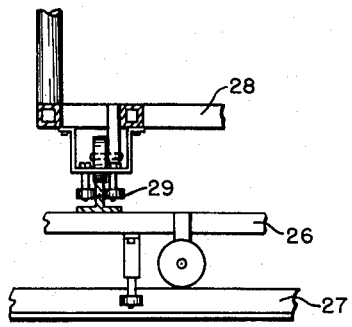
FIG. 10 is a fragmentary vertical section of the carriage arrangement, this section being taken on line 10—10 of FIG. 1.
Figure 2:
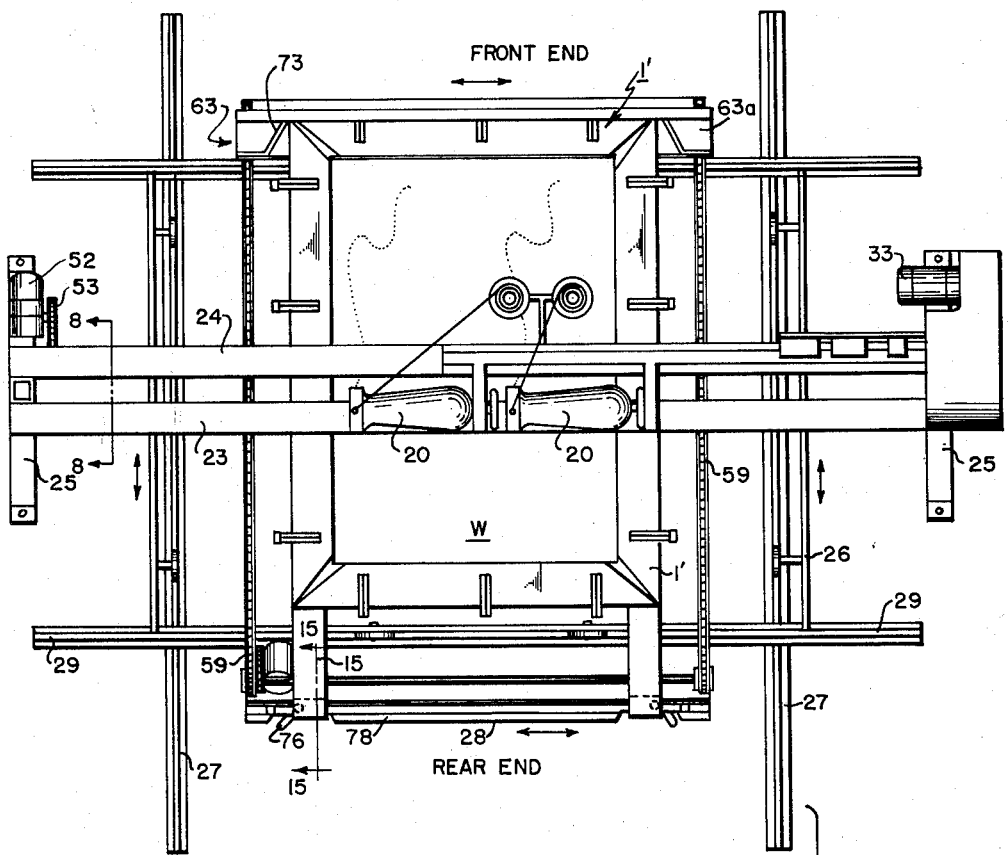
FIG. 2 is a top plan view of FIG. 1.
Figure 2:
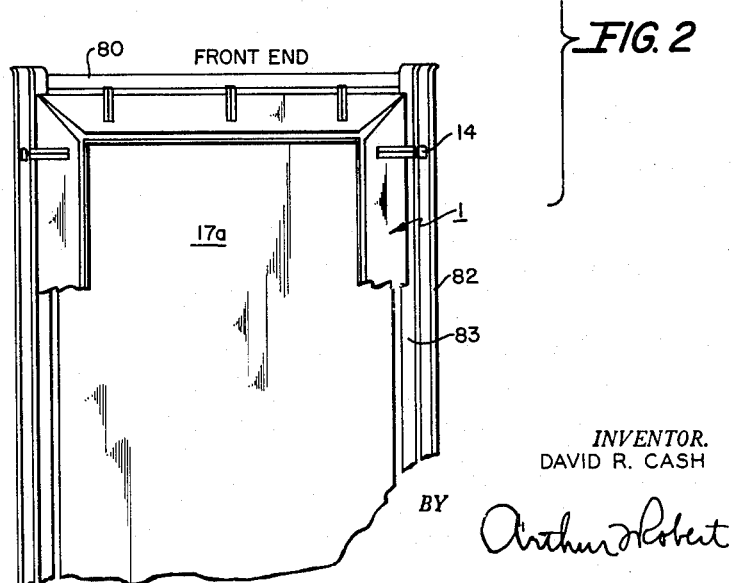

The quilting machine conveyor is driven by an electric motor 69 which, as shown in FIGS. 1 and 6, is mounted on the over-carriage 28 near the rear ends of the carriage 28 and the perimetric frame conveyor. The motor 69 is connected to the adjacent rear shaft 61 of the conveyor by a belt drive 70. The motor 69 is controlled to move in either direction by a switch 71 located where it is convenient for an operator. Since the operator normally stands near the rear of the over-carriage, switch 71 is mounted on the rear end of the over-carriage 28 as seen in FIGS. 11–12. Limit switches may be employed to stop the motor 69 at the forward and rearward limits of movement of the perimetric-frame conveyor or such movement may be stopped by the use of a switch 71 which automatically returns to a neutral position when released by the operator.

The holding means is mounted on said over-carriage to hold a perimetric frame, during the quilting operation, against movement relative to the fixed operative position of that frame on the over-carriage. Preferably, this holding means includes a means for centering each incoming perimetric frame. Preferably also, a centering means is provided for each end of the frame. Broadly stated, each end centering means is wholly supported by the over-carriage in position to engage an incoming perimetric frame at one end, which is transversely off-centered from the forward-rearward or long axis of its fixed operative position on the over-carriage, and to shift that end transversely into centered relationship with said long axis as that end moves forwardly toward its fixed operative position on the over-carriage.

Figure 13:
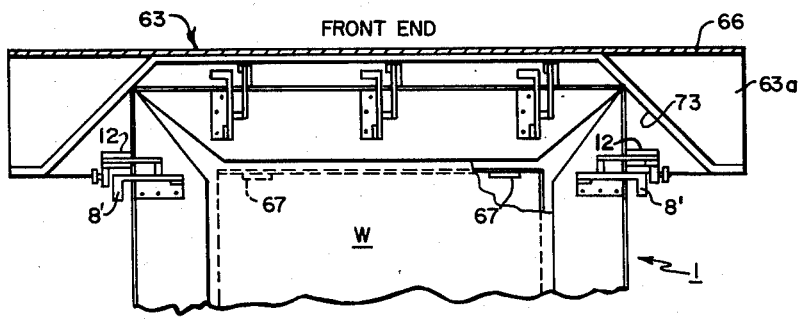
FIG. 13 is a fragmentary top plan view of the front end portion of a perimetric frame centered in the conveyor hitch or latch bar which is broken away along its extreme front end edge.

Thus as a perimetric frame moves forwardly into the latch bar 63, its front end is centered therein through the engagement of its front corners with forwardly converging cams 73 fixedly mounted in the latch bar 63 adjacent the opposite ends of bar 63 as seen in FIG. 13. These cams 73 force or guide the front end of the forwardly moving perimetric frame into an operative position in which that front end is centered relative to the long axis of the over-carriage 28 and the perimetric-frame conveyor on that over-carriage.

Figure 14:
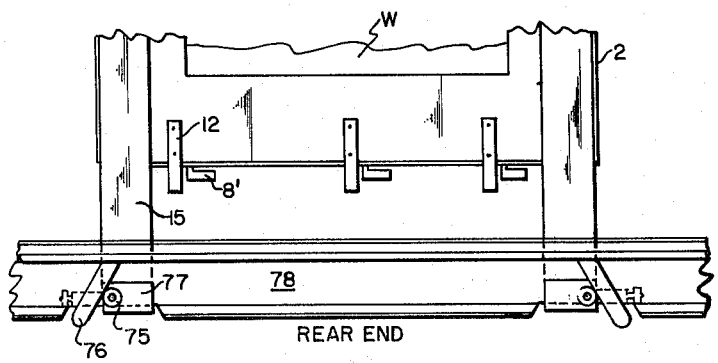
FIG. 14 is a fragmentary bottom plan view of the rear end portion of a perimetric frame centered in the rear end of the quilting machine for the sewing operation.

To center the rear end of a perimetric frame in its operative position, its rear end is arranged (on its under side) to engage forwardly converging guide members on the underlying over-carriage 28. Accordingly, as seen in FIGS. 14–15, a roller 75 is mounted on the underside of each of the special brackets 15 which project rearwardly from the end of each perimetric frame. Likewise the rear end of the over-carriage 28 is provided with a pair of transversely spaced forwardly converging horns or guides 76 which are positioned to engage the perimetric frame guide rollers 75 for frame centering purposes. It will be appreciated that the end centering means prevent an operatively positioned perimetric frame from moving horizontally out of its operative position.

The holding means also includes means restraining or locking an operatively positioned perimetric frame against movement upwardly, forwardly or laterally, out of its operative position. The short upper leg 65 of the latch bar 63 holds the front end of an operatively positioned perimetric frame from moving upwardly out of its centered position. To hold the rear end of an operatively positioned perimetric frame against upward movement out of its centered position, the underside of each special bracket 15, at the extreme rear end of each perimetric frame, is provided with a forwardly open C-shaped hook or latching member 77 which (as seen in FIG. 15) is positioned to receive a keeper 78 on the frame of the underlying over-carriage 28. In the embodiment shown, the keeper 78 is provided by the rear marginal edge portion of a cross plate, which functions as a part of the rigid frame of over-carriage 28.

TRANSPORT

The transport for contemporaneously interchanging perimetric frames between frame-transfer and workpiece-transfer positions, comprises: a transport preferably in the form of a double-decked elevator; and drive means for raising and lowering it.

*Double decked elevator—(FIGS. 1–2, 5–6 and 11–12)*

The double decked elevator comprises: a pair of transversely-extending upwardly-open U-shaped front and rear yokes 80 and 81 (FIGS. 1, 5) which, respectively, are spaced from the front and rear ends of the loading table 17; and a pair of upper tracks 82 and lower tracks 83, the opposite tracks of each pair being located alongside and spaced outwardly from the opposite sides of the table 17, the front and rear ends of each track being respectively connected to the front and rear yokes. The upper and lower pairs of tracks support their respective perimetric frames through the rollers 14 on such frames. These tracks may be said to provide upper and lower decks for supporting the perimetric frames and, since the upper perimetric frame 1 is wider than the lower perimetric frame 1', the upper tracks 82 are correspondingly spaced more widely than the lower tracks 83.

The tracks 82 and 83 guide their respective relatively movable perimetric frames through the front yoke 80 of the elevator during the forward delivery movement of each frame to, and the rearward discharge movement of each frame from, the quilting machine. The front ends of the tracks 82 and 83 are slightly flared to facilitate the entry of the perimetric frames while their rear ends are closed to function as perimetric frame stops.

It will be appreciated that the elevator horizontally encircles the table 17 and is spaced from the sides and ends thereof to avoid interference therewith during vertical movement relative thereto between the upper transfer level of the quilting machine and the lower transfer level of the table 17. In passing, it may be noted that the elevator encircles at least two sides and one end of the table 17 and is open at its front end to receive and discharge the perimetric frames.

*Elevator drive means*

Figure 5:
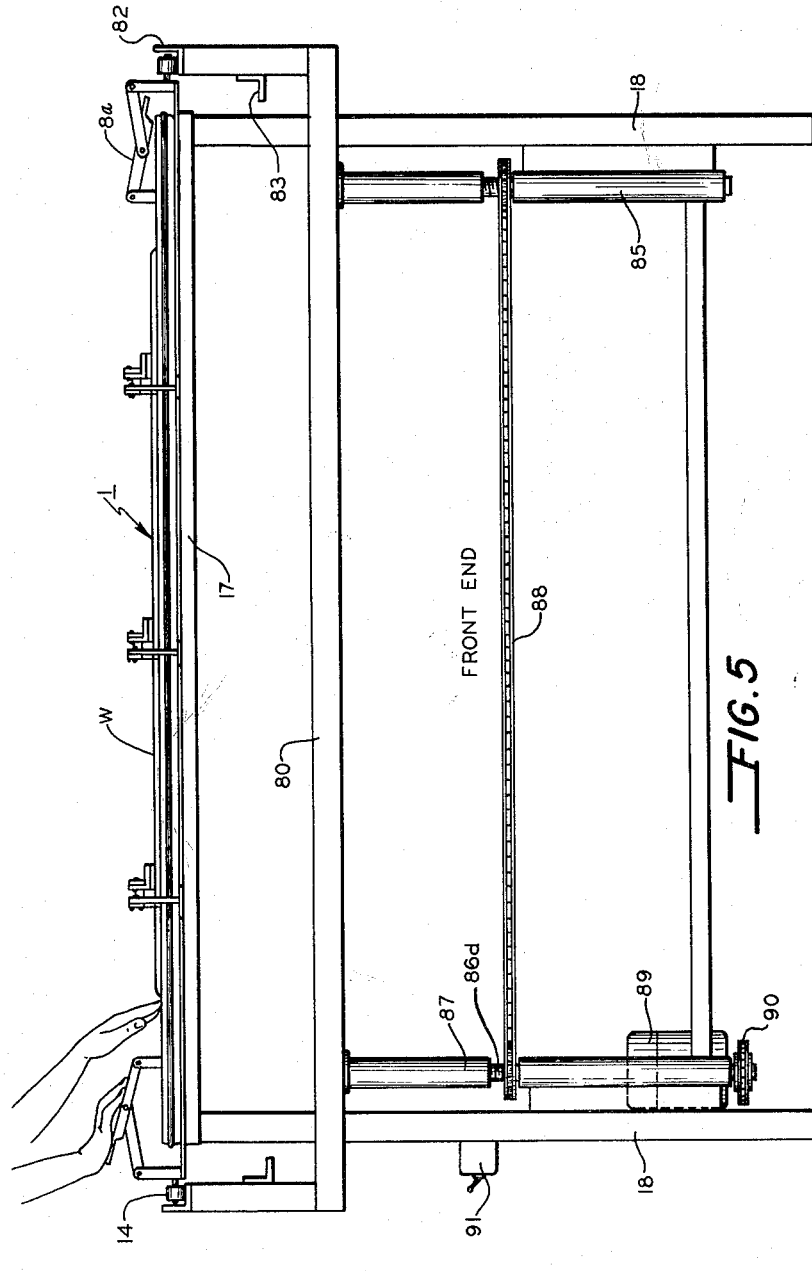
FIG. 5 is a front end elevational view of the loading table and of a wide work-holding perimetric frame being loaded at the (lower) transfer level of the table.

The elevator is supported on the loading table 17 for vertical movement by four screw jacks 85, one at each corner 18 of the table frame. As seen in FIGS. 5 and 6, each of the jacks comprise: front and rear pairs of stationary sleeve brackets 85 respectively spaced forwardly and rearwardly from the front and rear ends of the table 17, one sleeve bracket 85 being arranged adjacent each leg 18 of the table and each sleeve bracket being rigidly secured to and supported by the adjacent leg; four (4) vertical rotary screws 86, one for each sleeve bracket 85, each screw projecting upwardly out of its sleeve bracket and being rotationally anchored at its lower end to its sleeve bracket, it being understood that neither the sleeve bracket 85 nor its screw 86 move vertically; and four (4) threaded vertically movable sleeves or nuts 87, one for each screw 86, each nut 87 being threaded to the projecting part of its screw 86 and fixedly secured to the bight of the adjacent elevator yoke (80 or 81 as the case may be) so that, when the screws 86 rotate in one direction or another, the nuts 87 and the elevator will move vertically in one direction or the other.

The four jacks are ganged together to move in synchronism by providing each screw 86 with a drive sprocket and connecting these sprockets together through an endless chain 88. The screws 86 of the jacks are driven by a reversible elevator motor 89 mounted on one leg of the table frame and connected to the adjacent (drive) screw 86d by sprocket-chain 90, as seen in FIG. 5. A switch 91 controls the reversible movement of the elevator motor 89 in either direction and may be operated to stop it at any point in its range of movement. Conventional limit switches (not shown) may be used to stop the elevator and its drive motor at the upper and lower ends of the travel of the elevator frame.

The elevator should have a range of vertical movement sufficient to enable each of its deck-providing pairs of 82 and 83 to be moved from one transfer level to the other. At the lower workpiece transfer level, each perimetric frame preferably remains on the elevator. When the upper and wider perimetric frame is moved to the lower workpiece transfer level, the elevator preferably is stopped at a level slightly above the table top 17 to prevent that wide frame from being slammed against the table.

OPERATION

We assume: that the narrow perimetric frame 1' is in its operative position on the quilting machine as in FIG. 1; that the elevator is in its lowermost workpiece-transfer position as in FIG. 5; and that the elevator in FIG. 5 is holding the wide perimetric frame 1 at the lower or workpiece transfer level for unloading and reloading purposes. With these assumptions the operation of the machine involves: (1) unloading and reloading the wide perimetric frame 1 while it is on the elevator; (2) interchanging perimetric frames including transferring the narrow frame 1' from the machine to the elevator, transferring the wide frame 1 from the elevator to the machine, holding the wide frame 1 in its operative position on the machine and instituting the sewing operation; and (3) unloading and reloading the narrow perimetric frame 1' while it remains on the elevator.

*Unloading and reloading the wide perimetric frame on the elevator*

The toggle levers 8 and 8a on the wide perimetric frame 1 are now manipulated to unclamp each clamping plate and permit all such clamping plates to be swung open. As this is done, the sewn or finished workpiece will relax and rest upon the work table. The finished workpiece is now removed from the work table and replaced by an unsewn assembly which, in making mattress covers, normally comprises: an upper cover sheet; an intermediate layer of padding; and a lower layer of muslin. The side and end margins of this assembly are placed in the side and end chambers 6 of the perimetric frame 1 and then its clamping plates 5 are closed and clamped to stretch the assembly across the opening of that frame and anchor it to the periphery thereof.

*Interchanging perimetric frames—generally*

The wide perimetric frame 1 on the table is now ready to be interchanged with the narrow perimetric frame on the machine. To interchange perimetric frames, the narrow perimetric frame 1', which is held at the frame-transfer level on the quilting machine, must first be transferred to its deck on the elevator, then the newly-loaded wide perimetric frame 1 on the elevator must be moved to the frame-transfer level and then transferred to the quilting machine. Thereafter the narrow perimetric frame 1' remaining on the elevator must be carried to the lower workpiece transfer level for unloading-reloading purposes.

*Transferring narrow frame from machine to the elevator*

Accordingly, to prepare for the first transfer, the elevator motor switch 91 is operated to raise the elevator until its lower pair of deck-forming narrow-gauge tracks 83 are horizontally aligned with the upper frame-transfer level to receive the narrow perimetric frame 1' from the quilting machine, as shown in FIGS. 6 and 11. Also, the head frame 24 is swung upwardly to its out-of-the-way position shown in FIG. 9 by operating a switch (not shown) to energize the motor 52 which rotates shaft 50 through a half turn and then stops automatically through the agency of limit switches not shown. In making this half turn, shaft 50 pushes the crank 51 upwardly to an extent sufficient to swing the head frame 24 arcuately through an angle of about 45° which is enough to remove the sewing machine heads 20 a safe distance upwardly from the path which the perimetric frames follow during removal from an insertion into their operative position on the quilting machine.

Following the removal of the sewing heads 20, the narrow frame 1' is conveyed rearwardly some two or three feet to draw the thread, from both the sewing heads 20 and the lock-stitch mechanism or bobbins 21, a sufficient distance so that it can be cut by a knife or other cutting instrument. The narrow perimetric frame 1' may now be conveyed rearwardly along the top of over-carriage 28 by operating the switch 71 at the rear end of that carriage to energize the conveyor motor 69 and drive the conveyor chains 59 rearwardly. The rear end of the narrow perimetric frame 1' projects more and more from the quilting machine and, as shown in FIG. 11, correspondingly enters the lower deck formed by the lower pair of narrow gauge tracks 83 of the elevator where the rollers support it on the tracks 83.

Eventually, the latch bar 63 on the conveyor reaches the rear of the over-carriage 28 where it is tilted upwardly and rearwardly, as shown in FIG. 11, to release the frame 1'. Normally, the tilting of the conveyor latch bar 63 gives the narrow perimetric frame a sufficient impetus to drive it completely onto the elevator.

Transferring the wide frame from the elevator to the machine

With the removal of the narrow perimetric frame 1', the quilting machine is ready to receive the wide perimetric frame 1; hence, the elevator is lowered to align its upper deck-forming tracks 82 with the frame-transfer level, as shown in FIG. 12. Normally, this alignment operation need not be accurately performed because the conveyor latch bar 63 will operate properly over a vertical range of the perimetric-frame upper-level transfer positions. When a workable alignment has been achieved, the transfer of the wide frame 1 from the elevator onto the machine is instituted by manually moving the perimetric frame 1 forwardly into the conveyor latch bar 63, as shown in FIG. 12.

The initial forward movement of the wide frame 1 from the elevator to the machine should be effected in a manner such as to force the conveyor sufficiently forward to swing the latch bar to its horizontal position wherein the hook tabs 67 lock the wide frame 1 to the latch bar 63. Now the transfer of the wide frame 1 from the elevator to the machine may be completed by operating the switch 71 to energize conveyor motor 69 and drive the conveyor in the forward direction. As the conveyor moves forwardly, the latch bar 63 moves with it and pulls or drags the wide frame forwardly into its operative position.

Centering the wide frame on the machine

The front end of the wide frame 1 is centered by the converging cams 73 during the interval that frame enters the latch bar 63 and swings it to the horizontal position. Similarly, and at the same time, the rear end of the wide frame 1 is centered on the machine through the engagement of its rear centering rollers 75 and with the converging guides 76 of the underlying over-carriage 28.

Holding the wide frame in its operative position

As the front end rear ends are centered, the front end moves into a position where the short upper horizontal leg 65 of the latch bar 63 prevents it from rising upwardly away from the conveyor. At the same time, the forwardly-open C-shaped hooks 77, at the rear ends of the special brackets 15 of the wide perimetric frame, move forwardly into their latching or locking position with respect to the keepers 78 of the underlying over-carriage 28 and thus latch the rear end of the frame to the rear end of the over-carriage so as to hold it against vertical movement upwardly away from that carriage.

Instituting sewing operation

With the wide perimetric frame 1 operatively positioned, the conventional sewing heads are moved into their operative positions by swinging the head frame arcuately downward through the operation of motor 52, sprocket chain connection 53, crankshaft 50 and crank 51. When this is done, the sewing operation may then be instituted by energizing the common drive motor 33 through appropriate switches. Once the conventional quilting machine is set in operation, it will sew the workpiece W with the predetermined quilting design and at the completion of the design, automatically stop itself all without requiring any further attention from the operator. This operation requires from about 30 seconds to 2 minutes to perform, depending on the speed of the machine and the length of the design being quilted in the workpiece W.

Normally, each sewing operation is begun and finished at substantially the same spot on the workpiece W so that, at the end of the operation, the perimetric frame is in substantially the same position as it was at the start of the sewing operation. This is desirable because it results in the frame on the machine being aligned with the elevator 80. Otherwise it would be offset on one side or the other of the path leading to the elevator and thus require an additional aligning operation.

Unloading and reloading the narrow perimetric frame at the lower transfer level As soon as the sewing operation is instituted, the operator against operates the elevator loader switch 91 to lower the elevator until its narrowly-spaced deck-forming lower tracks 83 are horizontally aligned with or located at the lower or workpiece transfer level. Here again, this alignment need only be approximately made since it is workable over a vertical range of positions in which the finished workpiece more or less rests upon the top of the table. The narrow perimetric frame 1' is now opened to remove the finished workpiece and to receive the next unsewn workpiece. When the latter is in place, the clamping plates are closed and clamped to complete the reloading operation.

The elevator is now ready for the next interchange operation.

Having described my invention, I claim:

1. An improvement in a quilting machine which is adapted to receive and sew a workpiece, comprising:
    (A) means for operatively supporting a quilt in a horizontally-arranged attitude and for moving said supported quilt according to a desired quilt design during the quilt sewing operation;
    (B) a lower frame means;
    (C) upper frame means including
        (1) a head frame extending transversely across the quilting machine from one side of the machine to the other;
    (D) a sewing head mounted on said head frame; and
    (E) means mounting opposite end portions of said head frame upon said lower frame means at opposite sides of said machine for head frame movement
        (1) from one head frame position, in which said head frame holds said sewing head in an operative sewing position closely adjacent the top side of an operatively positioned quilt,
        (2) to another head frame position, in which said head frame holds said sewing head in an out-of-the-way position spaced further away from an operatively positioned quilt.

2. The machine of claim 1 wherein:
(A) said opposite end portions of said head frame are pivoted to said base frame to cause said head frame to swing circularly about a horizontal transverse axis in moving between the aforesaid positions.

3. The improvement of claim 2 including:
(A) a power transferring rotary member mounted on one of said frame means for rotation about said horizontal transverse axis; and
(B) a drive train for said sewing head,
    (1) said drive train being mounted on the head frame and operatively connected to said rotary member to be driven thereby.

4. The improvement of claim 2 including:
(A) motorized means mounted on the lower frame means and connected to swing said head frame about said pivotal axis from one head frame position to the other.

5. An improvement in a quilting machine which operatively supports a perimetric frame in a horizontally-arranged attitude and moves that frame in accordance with a desired quilt design while performing a sewing operation on a workpiece carried by that perimetric frame, comprising:
(A) a base frame;
(B) carriage means mounted on said base frame to support a perimetric frame for compound horizontal movement while performing said quilting operation,
    (1) said compound movement including a longitudinal back-and-forth component and a transverse side-to-side component,
    (2) said carriage means including
        (a) an undercarriage mounted on said base frame for one of said components of movement, and
        (b) an overcarriage mounted on and wholly supported by said undercarriage for the other of said components of movement;
(C) conveyor means mounted on and wholly supported by said overcarriage
    (1) for engaging and releasing incoming and outgoing perimetric frames at the rear end of the machine and
    (2) for moving
        (a) an incoming perimetric frame containing an unsewn workpiece forwardly, relative to said over-carriage, to an operative position which is fixed on said over-carriage, and
        (b) an outgoing perimetric frame, upon the completion of said quilting operation, rearwardly, relative to said over-carriage, to a frame releasing position;
(D) holding means mounted on said over-carriage for holding said perimetric frame, during said quilting operation, against movement relative to its fixed operative position on said over-carriage; and
(E) pattern drive means operative, when said perimetric frame is in its said operative position, to effect said compound movement of said perimetric frame, overcarriage, conveyor and holding means as a unit.

6. The quilting machine of claim 5 wherein:
(A) said holding means includes latch means mounted on said conveyor means to engage the front end of incoming perimetric frames and to release the front end of outgoing perimetric frames as they are discharged rearwardly.

7. The quilting machine of claim 6 wherein said latch means includes:
(A) a latch bar extending transversely across said conveyor means and having a correspondingly extending pocket to receive the front end of an incoming perimetric frame; and
(B) means mounting said latch bar on said conveyor
    (1) for forward and rearward movement bodily with said conveyor between said rear end of the machine and said fixed operative position, and
    (2) for movement relative to said conveyor between perimetric frame latching and unlatching positions.

8. The machine of claim 5 including:
(A) motorized drive means mounted on and wholly supported by said over-carriage and connected to move said conveyor means forwardly when actuated one way and rearwardly when actuated another way.

9. The machine of claim 5 including:
(A) centering means wholly supported by the over-carriage in position to engage an incoming perimetric frame at one end, and guide that end into centered relationship.

10. The machine of claim 9 wherein:
(A) said centering means includes forwardly converging guides.

11. The machine of claim 9 wherein said centering means includes:
(A) means mounted on said conveyor means in position to engage the front end of an incoming perimetric frame as that front end moves forwardly, relative to said conveyor means, in moving toward its fixed operative position on said conveyor; and
(B) means mounted on said over-carriage in position to engage the rear end of an incoming perimetric frame as that rear end moves forwardly, bodily with the conveyor means, toward its final fixed operative position on said over-carriage.

12. The machine of claim 5 including:
(A) mechanical means supported by the over-carriage for restraining a perimetric frame operatively positioned on said over-carriage against upward movement out of its fixed operative position on said over-carriage.

13. A quilting apparatus for use in sewing a workpiece which is mounted on a perimetric frame, comprising:
(A) a quilting machine having an end at which one perimetric frame on the machine may be horizontally removed and another perimetric frame may be horizontally delivered to the machine;
(B) a frame transport means having spaced first and second horizontal decks, the first deck to receive and support one perimetric frame from said end of the machine and the second deck to hold the other perimetric frame in readiness for delivery to said end of the machine upon the removal of said one perimetric frame from the machine; and
(C) means for moving said frame transport means
    (1) initially to align said first deck on the transport horizontally with the machine so that said one frame may be horizontally transferred from the machine to the first deck of the transport, and
    (2) thereafter to align said second deck on the transport horizontally with said machine so that said other frame may be horizontally transferred from the second deck of the transport means to said machine.

14. A quilting apparatus for sewing one workpiece on one perimetric frame during one interval and for use, during the same interval, in preparing an alternate perimetric frame by unloading any sewn workpiece from it with the next unsewn workpiece for the next sewing operation, comprising:
(A) a quilting machine having
    (1) means for receiving an incoming frame at one end, moving it to an operative sewing position, performing the sewing operation and then returning it to said end for removal from the machine, said frame being received by and removed from said machine at one elevation;

(B) a loading table adjacent said one end of the quilting machine,
   (1) said loading table having
      (a) means for receiving and supporting a perimetric frame for frame unloading and reloading purposes at a different elevation;
(C) an elevator for receiving and holding perimetric frames while conveying them from the machine to the table and vice versa,
   (1) said elevator having
      (a) one deck for holding one frame and
      (b) a vertically spaced deck for holding the other frame; and
(D) drive means for moving said elevator vertically to said elevations as required for the transfer of frames from the machine to the elevator and from the elevator to the machine.

15. The quilting apparatus of claim 14 wherein:
(A) said one deck is in the form of a pair of horizontally spaced trackways.

16. The quilting apparatus of claim 14 wherein:
(A) said other deck is wider than said one deck.

17. The quilting apparatus of claim 14 wherein:
(A) said elevator is mounted on said loading table for vertical movement relative to it.

References Cited by the Examiner
UNITED STATES PATENTS

| | | | |
|---|---|---|---|
| 1,313,308 | 8/19 | Lutz | 112—117 |
| 1,997,779 | 4/35 | Miller | 112—117 |
| 2,119,341 | 5/38 | Milner | 112—117 |
| 3,001,481 | 9/61 | Bond et al. | 112—2 |

JORDAN FRANKLIN, *Primary Examiner.*